US007843569B2

United States Patent
Birlem

(10) Patent No.: US 7,843,569 B2
(45) Date of Patent: Nov. 30, 2010

(54) HOUSING FOR AN OPTICAL MEASUREMENT DEVICE AND METHOD FOR PRODUCING A HOUSING

(75) Inventor: Olav Birlem, Erkelenz (DE)

(73) Assignee: Oerlikon Textile GmbH & Co. KG, Monchengladbach (DE)

( * ) Notice: Subject to any disclaimer, the term of this patent is extended or adjusted under 35 U.S.C. 154(b) by 342 days.

(21) Appl. No.: 12/083,737

(22) PCT Filed: Aug. 24, 2006

(86) PCT No.: PCT/EP2006/008298

§ 371 (c)(1),
(2), (4) Date: Apr. 18, 2008

(87) PCT Pub. No.: WO2007/045298

PCT Pub. Date: Apr. 26, 2007

(65) Prior Publication Data

US 2009/0257060 A1    Oct. 15, 2009

(30) Foreign Application Priority Data

Oct. 19, 2005  (DE) .................. 10 2005 050 057

(51) Int. Cl.
*G01N 21/84* (2006.01)
(52) U.S. Cl. .................................. 356/429
(58) Field of Classification Search .............. None
See application file for complete search history.

(56) References Cited

U.S. PATENT DOCUMENTS

| 4,123,344 | A | 10/1978 | Davis | 204/195 S |
| 4,728,800 | A | 3/1988 | Surka | 250/572 |
| 5,768,938 | A * | 6/1998 | Schilling et al. | 73/160 |
| 6,957,578 | B2 | 10/2005 | Birlem | 73/160 |
| 2003/0070481 | A1 * | 4/2003 | Birlem | 73/160 |
| 2007/0295732 | A1 * | 12/2007 | Albert et al. | 220/581 |

FOREIGN PATENT DOCUMENTS

| DE | 92 16 879 U1 | 7/1993 |
| DE | 195 19 817 A1 | 12/1996 |
| DE | 198 06 722 A1 | 8/1999 |
| DE | 101 50 581 A1 | 4/2003 |
| GB | 1 566 244 | 4/1980 |

* cited by examiner

*Primary Examiner*—Gregory J Toatley
*Assistant Examiner*—Amanda H Merlino
(74) *Attorney, Agent, or Firm*—K&L Gates LLP

(57) ABSTRACT

Housing (1) for an optical measurement device, in particular for yarn monitoring, and a method for producing such housing, from a plastics material by prototyping and receiving components of the measurement device such as a light source, sensor or lens. According to the invention, a glass insert (3) is arranged on the housing (1) and is used for the protection of the components from environmental influences, and the glass insert (3) is fitted into the housing (1) by means of the shrinkage occurring during prototyping in such a way that the housing.

16 Claims, 2 Drawing Sheets

HOUSING FOR AN OPTICAL MEASUREMENT DEVICE AND METHOD FOR PRODUCING A HOUSING

CROSS-REFERENCES TO RELATED APPLICATIONS

This application claims the benefit of German patent application 10 2005 050 057.9, filed Oct. 19, 2005, herein incorporated by reference.

BACKGROUND OF THE INVENTION

The present invention relates to a housing for an optical measurement device, e.g., for yarn monitoring, and more particularly to such a housing being produced from a plastics material by prototyping and receiving components of the measurement device such as the light source, sensor or lens. As used herein, the term "prototyping" refers specifically to a manufacturing methodology by which an amorphous body of material is formed into a solid object, e.g., via injection molding, according to the "Urformen" definition established by German DIN (Deutsches Institut für Normung, i.e., the German Institute for Standardization) Standard 8580. The present invention further relates to a method for producing a housing of an optical measurement device.

German Patent Publication DE 101 50 581 A1 describes a housing for a yarn sensor, which is produced from plastics material by the injection molding method and is used to receive electronic components of the yarn sensor. The housing has a measurement device with a measuring gap, through which a yarn is guided during the measurement. The measurement device comprises an optical sensor and a light source, which are enclosed in the measurement device and are arranged on the sides of the measuring gap facing the yarn. The surfaces of the measurement device become soiled while the yarn is being guided through as a result of finish adhering to the yarn or because of fibers or dust, which leads to an impairment of the measurement results. The required cleaning of the surfaces is problematical as with improper use of aggressive cleaners or by means of mechanical loading during cleaning, the surfaces of the measurement device may be directly damaged.

An optical measurement device for detecting discontinuous defects in a textile woven fabric is known from U.S. Pat. No. 4,728,800, in which the measurement device is arranged behind a glass panel for protection. The device comprises a housing which is used to receive optical components of a detector system. The textile woven fabric to be monitored is guided past the glass panel. The glass panel prevents the penetration of dust and other foreign bodies into the interior of the housing so that the function of the optical components of the measurement device is retained. The glass panel is received in a groove on one side of the housing and sealed with respect to the housing by a suitable seal and thus mounted in the groove by means of the sealing material.

The gluing of such glass panels to the housing by means of an adhesive is also known from the prior art. The aim of this gluing is also to prevent the penetration of dust or other foreign bodies through gaps produced because of joining tolerances which occur between the housing and the glass panel, into the measurement device, and also to produce mechanical strength to prevent the glass panel falling out.

These methods known from the prior art for attaching glass panels to the housing of the optical measurement device are not, however, able to eliminate or avoid a series of undesired influences. Thus, the adhesive used to glue the glass panels tends to be attacked or decomposed by cleaning agents which are used for the required regular cleaning of the glass panels. This can lead to the glass panels no longer being adequately secured against falling out.

This equally applies to the sealing material used according to U.S. Pat. No. 4,728,800. Moreover, at the edges of the glass panel projecting over the housing, fibers may accumulate on the adhesive or on the sealing material. This leads to the functionality of the measurement device being impaired because of the soiling from the fibers or dust, in particular if the measurement device is configured to carry out the detection of reflected light and the detection of shading.

SUMMARY OF THE INVENTION

The invention is therefore based on the object of proposing a housing for an optical measurement device while avoiding the drawbacks known from the prior art, as well as providing a method for producing a housing for an optical measurement device, which can be carried out simply and economically.

This object is achieved according to the invention by providing an improved housing for an optical measurement device, in particular for yarn monitoring, wherein the housing is produced from a plastics material by prototyping and receiving components of the measurement device such as the light source, sensor or lens. According to the invention, a glass insert is arranged on the housing and is used for the protection of the components from environmental influences, and the glass insert is fitted into the housing by means of the shrinkage occurring during prototyping in such a way that the housing sealingly encloses it in the manner of a frame. According to the invention, a method is provided for producing such a housing of an optical measurement device wherein the at least one glass insert, prior to the prototyping of the housing, is arranged in a mold being used to produce the housing. The at least one glass insert is connected to the housing during the prototyping of the housing in such a way that it receives its exact position and the sealing required for the components of the measurement device is ensured.

Advantageous further configurations, features and embodiments of the housing and the method of the present invention are described more fully hereinafter.

According to the invention, it is provided that a glass insert is arranged on the housing and is used for the protection of the components from environmental influences, and in that the glass insert is fitted into the housing by means of the shrinkage occurring during prototyping in such a way that the housing sealingly encloses it in the manner of a frame. In this manner, a closure which is sealed against dust is achieved between the glass insert and the housing so the quality of the measurement device arranged in the housing is maintained. As undesired accumulations of fiber or deposits of dust cannot occur in the gaps between the at least one glass insert and the housing which can have a lasting influence on the measuring accuracy, the outlay for keeping this region free in the measurement slot, through which the yarn to be monitored is supplied to the measurement device, is substantially reduced. Projecting edges, which are also prone to dust or fiber deposits are avoided by dispensing with the use of adhesives or other sealing and fixing materials.

In particular, the glass insert may terminate flush with the housing surrounding it. As a result, no edges projecting over the housing surface are formed as is the case with the types of fastening according to the prior art which lead to undesired fiber or dust deposits.

Preferably, the plastics material used to produce the housing may be a high-strength plastics material with a low tendency to shrink. A plastics material of this type is distinguished in that the housing produced from it is so warp-resistant that breakage of the glass insert through a slight twisting of the housing because of an outer mechanical stress, such as occurs, for example, in the required cleaning of the glass insert, can be avoided. On the other hand, the tendency to shrink, as already stated, is sufficient to fit in the glass insert during prototyping in a sealing and flush manner.

In particular, the plastics material may substantially consist of a partially crystalline aromatised thermoplastic, such as polyarylamide. A mechanically loadable, warp-resistant housing can be produced therefrom. This is achieved, in particular, by the use of filler materials, such as, for example glass fibers, mineral fillers, carbon fibers or the like which are added to the thermoplastic. The compressive forces occurring during the shrinking of the plastics material used to produce the housing, in particular at the outer edges of the glass insert, because of their small size, do not lead to the glass insert shattering owing to the inner stresses produced therein when the glass insert is fitted into the housing by the process of shrinking.

In a preferred development of the invention, the glass insert may have a material thickness of between 0.5 mm and 2 mm. In this case, the glass insert may have plane-parallel surfaces. It has surprisingly been shown that the shrinkage behaviour of the plastics material allows the use of glass inserts with a smaller material thickness. The elasticity of the glass insert is sufficient in order to be able to absorb stresses produced during shrinking without the glass insert breaking. On the other hand, the glass insert is so dimensionally stable that deformations of the surface which could lead to measurement value falsification, do not occur.

The path of the light to be covered through the glass insert is minimised by the glass insert having a material thickness which is as small as possible. This is a particular advantage for the measurement accuracy and the outlay for measurement as with an increasing material thickness, the scattering of the light issuing from a light source on its way to a receiver, such as, for example, a photodiode or another optical sensor, increases. In order to compensate for the longer path, the surface of the receiver would have to be correspondingly increased. However, this is accompanied by an increasing influence of extraneous light which impinges on the receiver and negatively influences its measurement accuracy. Extraneous light is taken to mean, for example, daylight or artificial lighting which may directly or indirectly impinge on the receiver through the glass insert. The use of glass inserts with a small material thickness therefore allows the use of receivers with a small surface, so the measurement accuracy is improved by the reduction in the extraneous light influences. Moreover, the plastics material used for the housing allows the use of glass with this small material thickness since because of the high rigidity and dimensional stability of the housing a mechanical loading applied to the housing does not lead to the glass insert being destroyed.

Furthermore, the housing may have a metallic coating applied by electroplating. The coating of the housing is above all used to protect the sensitive electronic components from electrostatic discharges, which negatively influence the measurement accuracy and service life.

For this purpose, the glass insert has a proportion of lead which is low or non-existent such that metallising of the glass insert is avoided during the electroplating.

Webs, which overlap the at least one glass insert in sections on its side facing the interior of the housing on its edges can advantageously be arranged in the interior of the housing. It can thus be avoided that the at least one glass insert is pressed into the interior of the housing by a pressure exerted from the outside on its surface, for example during the required cleaning of the glass insert, which may in turn lead to damage of the measurement device or at least to the destruction of the glass insert.

As an alternative to a plane-parallel configuration of the surfaces of the glass insert, the glass insert may be configured with a planar and a curved surface. Likewise, the two surfaces may be curved. As a result, the glass insert may take on additional optical functions.

Advantageously, two opposing glass inserts may be arranged in the region of a measurement slot being used to supply an object for measurement. This allows the opposing arrangement of a light source as a transmitter and of a sensor as a receiver, which proves to be an advantageous arrangement for the measurement purposes.

According to the invention, it is proposed that the at least one glass insert is arranged prior to the prototyping of the housing in a mold being used to produce the housing and that the at least one glass insert is connected to the housing during the prototyping of the housing in such a way that it maintains its exact position and ensures the sealing required for the components of the measurement device. The exact fitting which can be achieved in this manner of the at least one glass insert in the housing has the advantage that the interior of the housing which is used to receive the components of the optical measurement device is screened and remains substantially free of dust or other foreign bodies. A precisely fitting arrangement of the at least one glass insert in the recess of the housing provided for this is also achieved during prototyping.

A retrospective insertion of the at least one glass insert into the housing and the adhesion thereto in a subsequent work operation is no longer necessary so the production costs are reduced. By dispensing with the use of adhesives or other sealing or fixing means to fasten and seal the glass insert, no additional edges occur at the housing surrounding the glass insert, on which an undesired accumulation of fibers or dust may occur. Furthermore, the glass insert attached in this manner is insensitive to cleaning agents, as no substances for sealing or fastening are located between the glass insert and the housing, which can be attacked or decomposed by the cleaning agents.

Advantageously, the glass insert can be clamped in by the surrounding housing by the shrinking of the material used to produce the housing. In this manner, the shrinkage always occurring during prototyping of the material used to produce the housing can be made use of and a flush and positive fit of the glass insert in the housing can be achieved without having to use additional auxiliary means here for sealing or fastening.

In particular, a penetration-free arrangement of the glass insert can be achieved on the housing by the shrinking process following the prototyping. Because of dispensing with the use of, for example, rivets, screws or the like, by means of which the glass insert can be fastened to the housing as an alternative to using an adhesive or a corresponding sealing or fixing means, no additional projections are produced in the measurement region which are application points for an accumulation of fibers or dust on edges or on elevations projecting over the surface of the housing or the glass insert.

Furthermore, the housing may be electroplated after the prototyping. An electroplated coating leads to a uniform and gapless coating, which can be economically applied to a chemically applied base layer. This has the advantage that any capillary gaps caused by production or irregularities in the transition region between the housing and the glass insert can be filled up and compensated.

A further advantage of electroplating the housing consists in that a narrow frame is formed during electroplating around the edge of the glass insert which frame encloses the transition between the housing and the glass insert. This frame contributes to additionally fixing the glass insert.

The electroplating of the housing requires a uniform material composition of the surfaces to be coated as the use of different materials leads to the use of different liquids in the electroplating baths which have to be matched to the respective materials. Thus, for example, the use of buffer or insulating material surrounding the edge of the glass insert is not possible. The application of a protective layer onto the surface of the glass insert is also ruled out as it influences the optical properties.

Furthermore, the housing may be heat-treated after the electroplating to reduce remaining residual stresses in the glass insert.

BRIEF DESCRIPTION OF THE DRAWINGS

The invention will be described in more detail below with the aid of an embodiment shown in the drawings, in which.

DETAILED DESCRIPTION OF THE PREFERRED EMBODIMENTS

Figure 1:
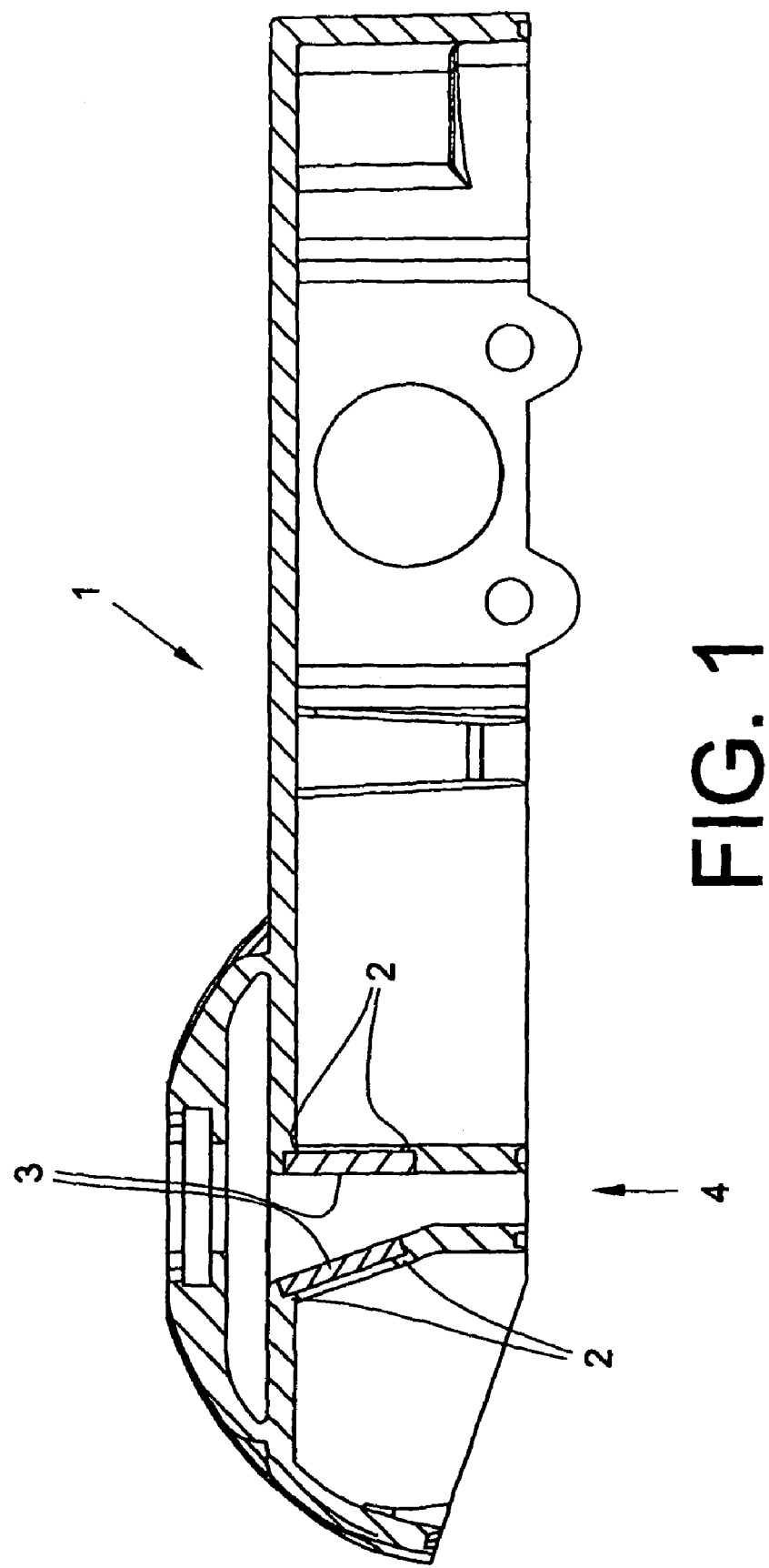
FIG. 1 shows a sectional view of a housing of an optical measurement device.

The optical measurement device shown in FIG. 1, as can be used for example as a yarn monitoring device at a spinning station of a rotor spinning machine, is preferably equipped to carry out reflective light detection and detection of the shading. The functional principle of measurement devices of this type is known and is not therefore explained in more detail here.

The yarn monitoring device is arranged in a housing 1, which has a measurement slot 4, such is used for guiding through a yarn to be monitored. The yarn is guided through the measurement slot 4 past optical means, such as lenses, sensors, lights sources and the like arranged in the housing 1, to continuously monitor the quality thereof. To protect the optical means from soiling, the housing 1 is closed in the measurement region of the measurement slot 4 by transparent covers.

The covers are configured as glass inserts 3. The use of glass inserts 3 as covers has the advantage of simple and economical production. Furthermore, the glass inserts 3 in comparison to the previously frequently used plastics material panels are largely insensitive to the use of cleaning agents for cleaning finish and the like from the covers. Moreover, glass inserts 3 do not acquire a static charge in contrast to plastics material inserts, which would otherwise lead to a soiling of the surface of the cover by adhering fiber and dust particles.

The housing 1 is produced by prototyping by the injection molding method from plastics material. To fasten the glass inserts 3 on the housing 1 it is provided according to the invention to arrange the glass inserts 3 in the mold provided for this prior to the production of the housing 1 by injection molding in such a way that they already adopt their position provided on the finished housing 1 prior to injection molding. The glass inserts 3 arranged in the mold are then injection molded around. By a suitable selection of the plastics material used to produce the housing 1, for example on the basis of partially crystalline aromatised thermoplastics, such as the polyarylamide known by the name IXEF or Grivory, which are high-strength plastics materials with a low tendency to shrink, it is achieved that the glass inserts 3 are fitted into the housing 1 during the shrinking process following the injection molding. The low tendency to shrink of these plastics materials means that the compressive forces occurring during the shrinking of the plastics material used to produce the housing 1, in particular at the outer edges of the glass inserts 3 do not lead to these shattering owing to the stresses produced there.

To avoid the glass inserts 3 being pressed into the interior of the housing 1 by a pressure exerted on them from the outside, for example during the cleaning of the glass inserts 3, webs 2, which overlap the respective glass insert 3 at least in sections on the side thereof facing the interior of the housing 1 on the edges thereof are provided in the interior of the housing 1.

Following the shrinking process, the housing 1 is electroplated, so gaps possibly remaining between the housing 1 and the glass inserts 3 are filled up and sealed with the metal used for electroplating. To avoid metal being deposited on the surface of the glass inserts 3 during the electroplating, a glass is used to produce the glass inserts 3 which has a very low or non-existent proportion of lead.

Furthermore, a narrow frame is configured during electroplating around the edge of the glass insert, which frame encloses the transition between the housing and the glass insert. Any possibly existing edges or irregularities in the region between the housing and the glass insert are compensated by this frame. In addition, this frame contributes to additionally fixing the glass insert to protect it from falling out.

Figure 2:
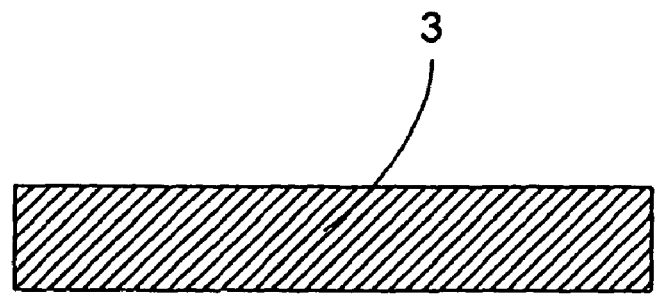
FIG. 2 shows a sectional view of a first embodiment of a glass insert.
Figure 3:
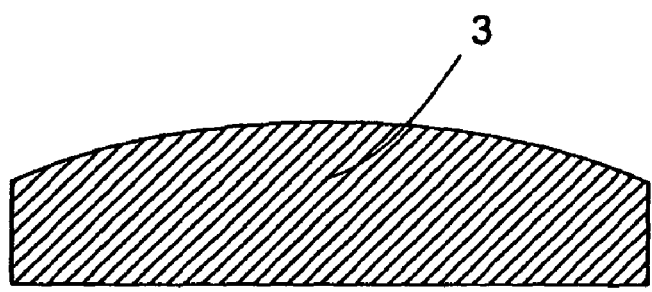
FIG. 3 shows a sectional view of a second embodiment of a glass insert.
Figure 4:
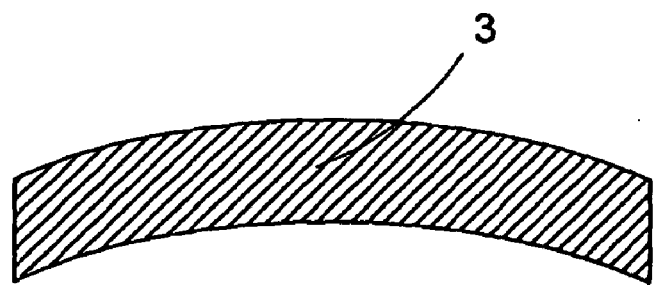
FIG. 4 shows a sectional view of a third embodiment of a glass insert.

FIG. 2 to FIG. 4 show three embodiments of the glass insert 3, the glass insert 3 shown in FIG. 2 having plane-parallel surfaces, while the glass insert 3 shown in FIG. 3 has a planar and a curved surface. According to FIG. 4, the two surfaces are curved. The material thickness of the glass insert 3 is between 0.5 mm and 2 mm, in this case.

What is claimed is:

1. Housing (1) for an optical measurement device, the housing (1) being produced from a plastics material by prototyping and receiving components of the measurement device, characterised in that a glass insert (3) is arranged on the housing (1) and is used for the protection of the components from environmental influences, and in that the glass insert (3) is fitted into the housing (1) by means of shrinkage of the housing occurring during prototyping in such a way that the housing (1) sealingly encloses the glass insert in the manner of a frame without adhesive or another sealing element between the glass insert and the housing.

2. Housing (1) according to claim 1, characterised in that the glass insert (3) terminates flush with the housing (1) surrounding it.

3. Housing (1) according to claim 1, characterised in that the plastics material used to produce the housing (1) is a high-strength plastics material with a low tendency to shrink.

4. Housing (1) according to claim 1, characterised in that the plastics material substantially consists of partially crystalline aromatised thermoplastics.

5. Housing (1) according to claim 1, characterised in that the glass insert (3) has a material thickness of between 0.5 mm and 2 mm.

6. Housing (1) according to claim 1, characterised in that the housing (1) has a metallic coating applied by electroplating.

7. Housing (1) according to claim 1, characterised in that the glass insert (3) has a proportion of lead which is low or non-existent such that metallisation of the glass insert (3) is avoided during the electroplating of the housing (1).

8. Housing (1) according to claim 1, characterised in that webs (2) which overlap the respective glass insert (3) in sections on the side thereof facing the interior of the housing (1) at the edges thereof are arranged in the interior of the housing (1).

9. Housing (1) according to claim 1, characterised in that the glass insert (3) is configured with a planar and a curved surface.

10. Housing (1) according to claim 1, characterised in that two opposing glass inserts (3) are arranged in the region of a measurement slot (4) being used to supply an object for measurement.

11. Housing according to claim 1, characterised in that the optical measurement device is adapted for yarn monitoring.

12. Housing according to claim 1, characterised in that the housing is adapted for receiving light source, sensor or lens components of the measurement device.

13. Method for producing a housing (1) of an optical measurement device, wherein the housing (1) is produced from a plastics material by prototyping and receiving components of the measurement device, characterised in that
- at least one glass insert (3), prior to the prototyping of the housing (1), is arranged in a mold being used to produce the housing (1);
- during the prototyping of the housing, shrinkage of the plastics material is induced; and
- the at least one glass insert (3) is sealably connected to the housing (1) by the shrinkage occurring during the prototyping of the housing (1) in such a way that it receives its exact position and the sealing required for the components of the measurement device is ensured without adhesive or another sealing element between the glass insert and the housing.

14. Method according to claim 13, characterised in that the glass insert (3) is clamped in by the shrinkage of the material used to produce the housing (1).

15. Method according to claim 13, characterised in that the housing (1) is electroplated.

16. Method according to claim 15, characterised in that the housing (1) is heat-treated after the electroplating.

\* \* \* \* \*